Sept. 16, 1924.                    S. TROOD                    1,508,670
                                    CHAIN
                              Filed Feb. 17, 1922
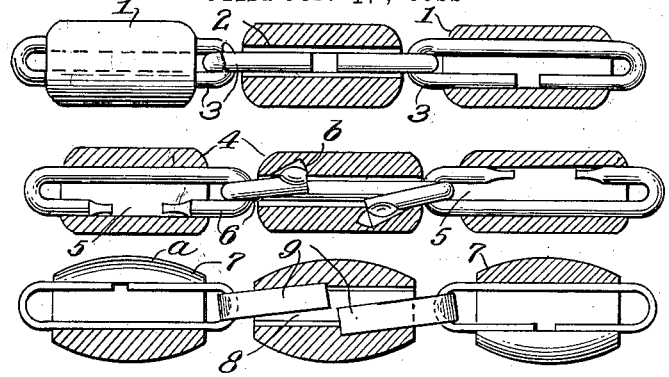
Fig.1.
Fig.2.
Fig.3.
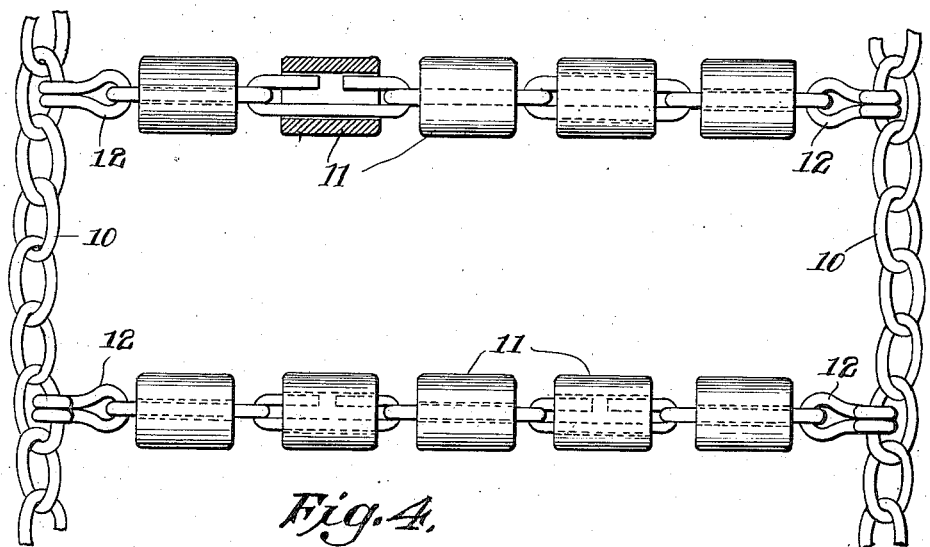
Fig.4.
WITNESS                                                INVENTOR Patented Sept. 16, 1924.

1,508,670

UNITED STATES PATENT OFFICE.

SAMUEL TROOD, OF HAYSVILLE, PENNSYLVANIA; SOPHIA TROOD, ADMINISTRATRIX OF SAID SAMUEL TROOD, DECEASED, ASSIGNOR OF ONE-FOURTH TO JOHN H. RONEY, OF INGRAM BOROUGH, PENNSYLVANIA.

CHAIN.

Application filed February 17, 1922. Serial No. 537,166.

*To all whom it may concern:*

Be it known that I, SAMUEL TROOD, a citizen of the United States, residing at Haysville, in the county of Allegheny and State of Pennsylvania, have invented a new and useful Improvement in Chains, of which improvement the following is a specification.

My invention relates to improvements in chains, and particularly in chains used in connection with vehicle tires for the purpose of preventing the said vehicles from skidding on slippery surfaces. The several individual links of said chains are also applicable to and may be used as repair links for chains.

The object of the invention is to primarily produce a chain having units formed of hardened material which constitute the wearing surfaces, the said units being held together or connected by a member of less hardness than the wearing member, the purpose being to produce a chain having hardened bearing or wearing members which, when used as a non-skid device, engage the surfaces of the road and which from their hardness are capable of a long period of use. Another purpose is the production of a chain which can be quickly assembled or put together without welding or the use of rivets, the construction of the wearing and connecting members serving to without other or additional elements produce a chain of exceptional strength firmly connected, and having maximum wearing capacity which may be formed of any desired length or, when formed, may be reduced in length, if required. I accomplish these objects by means of the device hereinafter more specifically described, reference being had to the accompanying drawings forming part hereof, in which:

Figure 1 is an elevation partly in section of the fragmentary portion of a chain showing the application of my improved link element.

Figure 2 is a side sectional elevation of a modified form of the chain.

Figure 3 is a side sectional elevation of another modification.

Fig. 4 is a view showing the application of my improved chain as a non-skid device.

Referring to said drawings and particularly to Fig. 1: 1, 1 are members made of hardened steel which constitute when assembled the wearing surfaces of the chain which contact with the earth or ground. The said members are preferably formed of case hardened steel and are each provided with an oblong channel or orifice 2 longitudinally thereof in which an elongated separable link 3, hereinafter called the connecting member, is inserted and seated. The said link connecting member is formed of a steel or iron rod bent to form an elongated loop, the separable ends and the intermediate portions of which are securely held in the channel 2 of the wearing member. The looped ends of each of said link connecting members, when inserted in the opening 2, project at and beyond the ends of said opening, constituting eyes in which the adjacent link connecting members may be secured, as shown in Fig. 1.

In Fig. 2, I show a modified form of my device, which comprises the wearing members 4, each of which is provided with an orifice or channel longitudinally thereof, in all respects similar to the channel shown in Fig. 1, excepting at the ends thereof a recess *b* is formed in which the flattened separable ends of the link members 6 are adapted to engage, as shown in Fig. 2.

In Fig. 3, I show another modification which comprises the wearing members 7, each of which is provided with a channel or orifice 8 longitudinally thereof, in all respects similar to that shown in Fig. 2. The said channels are each provided with recesses similar to that shown in Fig. 2, in which the separable ends of the flat link connecting members 9 engage. The cross-sectional configuration of the channels or orifices in the wearing members is such as will permit the intermediate portions of the loop connecting members to be seated snugly therein. It will be observed that the wearing members are closely disposed and that the connecting link members are disposed at right angles between the adjacent ends of said wearing members, and when assembled the wearing members are so arranged with relation to each other, and with relation to the said connecting members, that the greatest dimension of the channel in every wearing member is alternately disposed vertically and horizontally, and the link connecting members are correspondingly disposed in said channels, so that the greatest transverse dimension of every link connecting member is opposed to the least transverse dimension of the channel in the wearing members, whereby the said members are connected and securely held together without welding and without using any additional element or feature or construction.

In Fig. 4, I show my invention applied to a non-skid device or a chain for the purpose of preventing the wheels of vehicles skidding. In said Fig. 10, 10 are the usual side chains which may be made in the usual manner. 11, 11 are series of hardened members similar in every respect to the members 1 shown in Fig. 1. The outer ends of the separate links of each series of said members being connected to the links 12 which are adapted to be attached to the side chains 10.

Having described my invention, what I claim and desire to secure by Letters Patent is:—

1. A unit for chains comprising a wearing member having a channel longitudinally thereof, substantially oblong in cross sectional dimension, and a connecting member consisting of a rod bent to form an elongated link corresponding in configuration with said channel, the intermediate portion and the separable ends of said connecting member being seated in the channel in said wearing member, and the curved ends projecting from opposite ends of said channel.

2. A non-welded chain comprising a series of wearing members, each having a channel longitudinally thereof substantially oblong in cross sectional dimension and connecting members, including separable elongated links corresponding in configuration with the channels in the wearing members, the intermediate portions and the separable ends of said links being seated in the channels formed in said wearing members.

3. A non-welded chain comprising a series of wearing members, each having a channel longitudinally thereof, substantially oblong in cross sectional dimension, and connecting members, including elongated links corresponding in configuration with the channels in the wearing members, the intermediate portions and the separable ends of said links being seated in the channels formed in said wearing members, the said wearing members and said connecting members being so arranged with relation to each other when assembled, that the greatest transverse dimension of every link connecting member is opposed to the least transverse dimension of the channel in the wearing member.

4. A chain comprising a series of wearing members, formed of hardened metal, each having a channel longitudinally thereof substantially oblong in cross sectional dimension, and connecting members, including separable elongated links corresponding in configuration with the channels in said wearing members, the intermediate portions and the separable ends of said links being seated snugly and held securely in the channels formed in said wearing members.

5. A non-skid device for vehicles comprising a series of chains formed of wearing members of hardened metal, and connecting members comprising separable links, and a pair of chains to which respectively the ends of each of said first mentioned chains respectively are connected at intervals, each of said wearing members having a channel longitudinally thereof oblong in cross sectional dimension in which the intermediate portion and the separable ends of said connecting members are seated snugly and held securely.

In testimony whereof, I have hereunto signed my name in the presence of two subscribing witnesses.

SAMUEL TROOD.

In the presence of—
  JOHN H. RONEY,
  CLARENCE A. WILLIAMS.